UNITED STATES PATENT OFFICE.

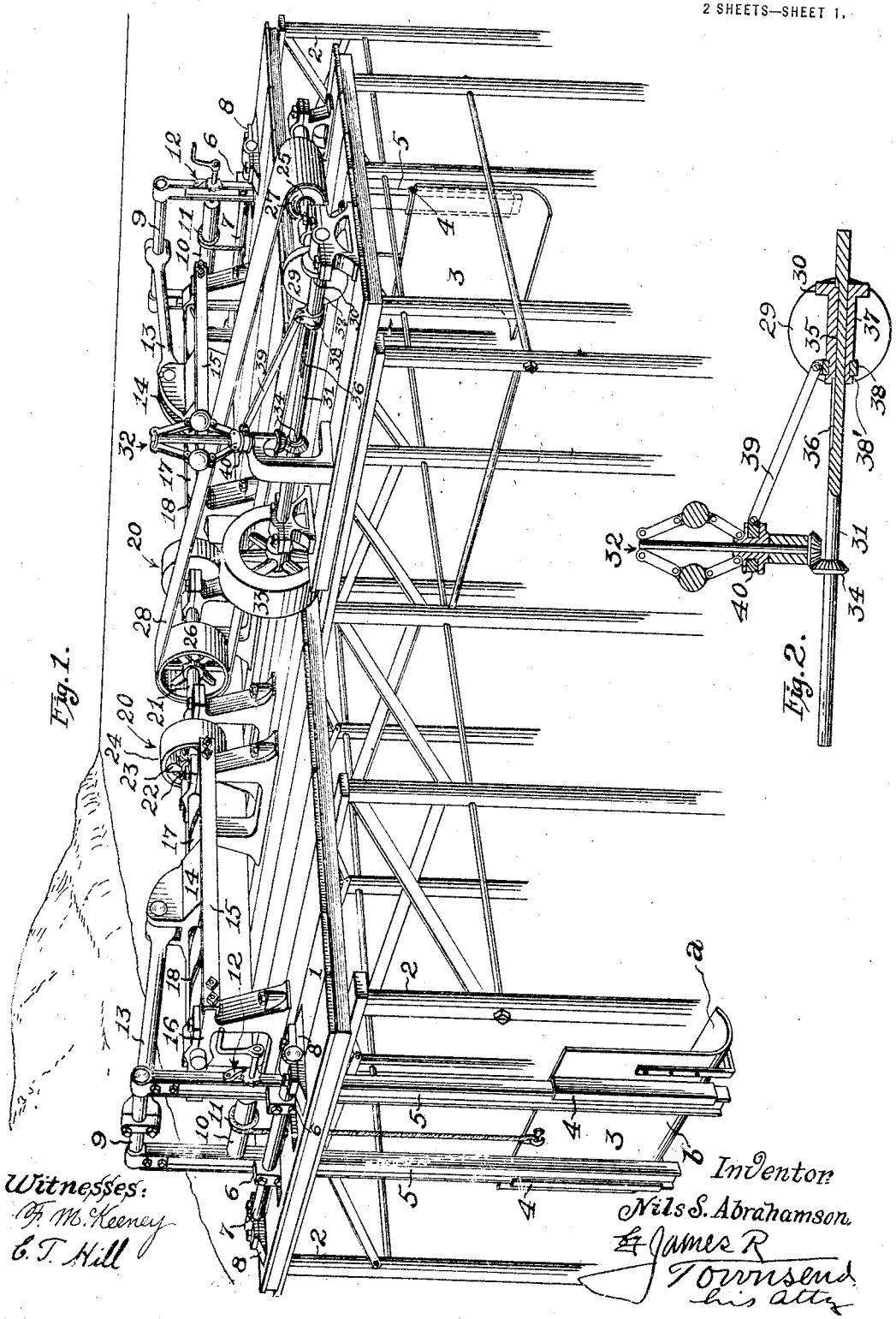

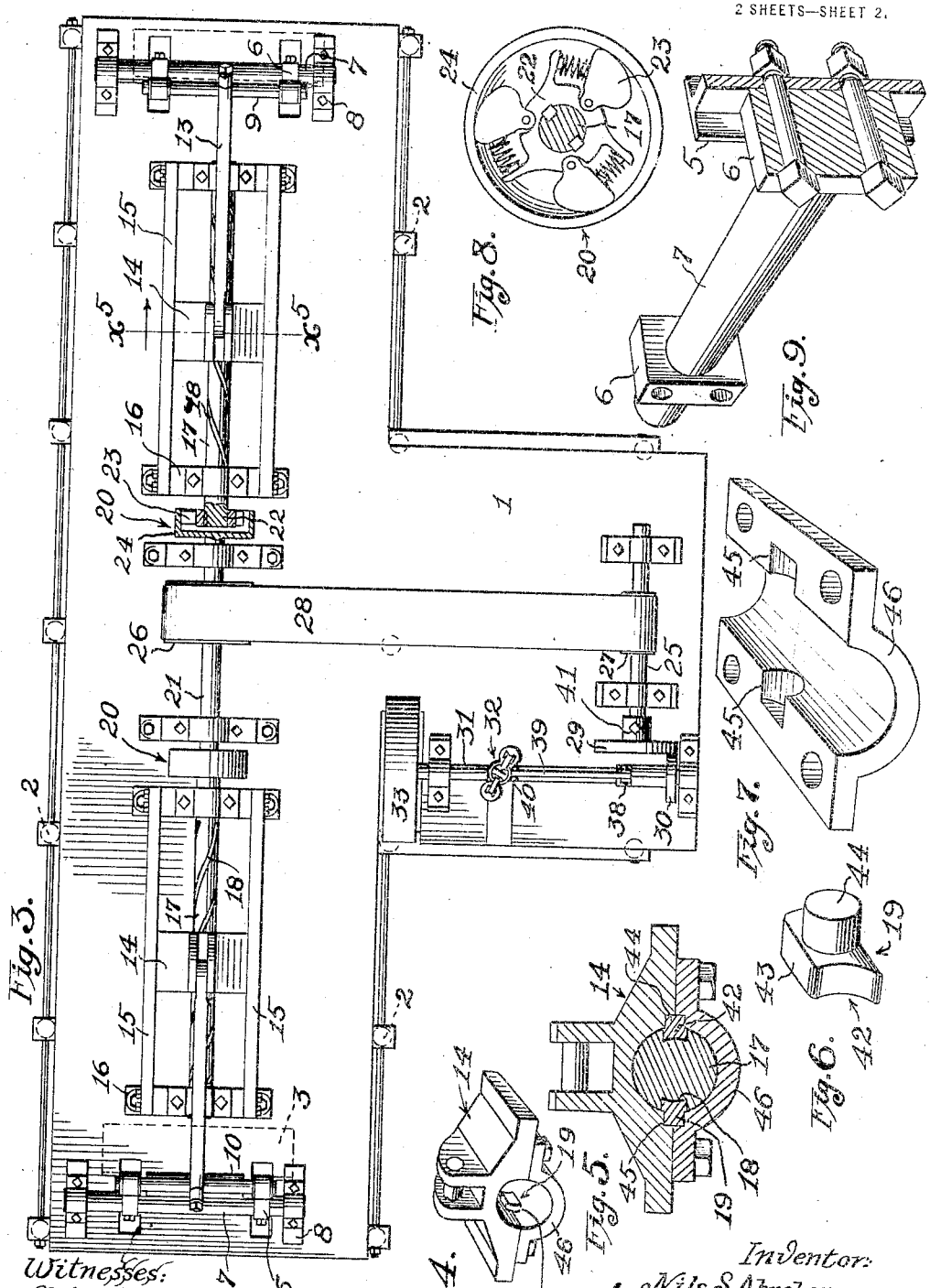

NILS S. ABRAHAMSON, OF LOS ANGELES, CALIFORNIA.

OCEAN-POWER.

1,226,937.  Specification of Letters Patent.  Patented May 22, 1917.

Application filed July 27, 1914. Serial No. 853,471.

*To all whom it may concern:*

Be it known that I, NILS S. ABRAHAMSON, a citizen of the United States, residing at Los Angeles, in the county of Los Angeles and State of California, have invented a new and useful Ocean-Power, of which the following is a specification.

This invention has relation to an improved device for generating power from the ocean and comprehends pendulent mechanical elements actuated by the waves and surf, mechanism coöperating therewith in transforming the relative pendulous motion of the swinging elements into continuous rotary motion and a momentum receiver and speed governing means in connection with the rotary motion, that the resultant mechanical energy may be utilized in operating power appliances.

The objects of the invention are to generate and produce mechanical power economically and in sufficient quantities for commercial use.

Other objects are to secure mechanical motion for power purposes with simple and efficient apparatus, to produce a uniform speed regulated rotary motion under varying conditions of load, to utilize frictional clutch means between the elements subjected to the extremely variable and sudden action of the waves and surf and the rotative power element, whereby danger of breakage is minimized, and frictional pulley means between the momentum retaining and speed governing elements and rotating power elements, to secure increased convenience in replacing parts subjected to wear, and to so rotate the mechanical elements and mechanism that the means of power production shall approach as nearly as possible automatic operation.

To attain the objects of the invention the mechanical elements thereof are incorporated in a new and novel combination consisting more particularly of swinging paddles, means for converting the oscillating movements of the paddles, into a reciprocating linear motion, means for transforming the reciprocating motion into a continuous rotary motion adaptable for actuating power appliances, and momentum means to stabilize such rotary motion, the arrangement of the elements being such that the translation of the latent energy of the ocean into direct mechanical energy is accomplished with a minimum loss of power.

For a more thorough explanation of the principles of the invention reference may be had to the drawings and the subjoined detail description in which is exhibited a mechanical embodiment necessary to accomplish the objects of the invention.

Figure 1 is a perspective view of a device possessing the essential elements of the invention, disclosing the relative position of the parts and their disposition with reference to the ocean.

Fig. 2 is a detail view of the governor for securing uniformity of speed of rotation.

Fig. 3 is a plan view showing the disposition of parts.

Fig. 4 is a detail view of the reciprocating shaft driving member.

Fig. 5 is a sectional detail view of a reciprocating element taken on line $x^5$, of Fig. 3.

Fig. 6 is a detail view of one of the cams which engages the spiral grooved shaft actuated by the reciprocating element.

Fig. 7 is a detail view of the cap which clamps the cams within the reciprocating members.

Fig. 8 is a detail view of the clutch member, transmitting power from the primary shafts to an intermediate shaft.

Fig. 9 is a detail view showing the method of bolting the swinging I beams to their pivotal shaft, a fragment of an I beam and a hub of the shaft being in section.

In the several views like reference characters apply to like parts.

A platform frame 1, supporting the rotating elements and power transmission means, is mounted on suitable piles 2, projecting above the ocean adjacent to the shore. The platform frame is relatively disposed in a position with reference to the water to fully utilize the wave movements in actuating paddles 3, which are provided with braces 4, preferably channel irons and disposed on the paddles in pairs with the channels in opposed relation. Each pair of braces 4 is slidably engaged with corresponding pairs of swinging I beams 5 which are bolted to hubs 6 of shafts 7, respectively journaled in bearing boxes 8 on the platform. Each pair of beams 5 is connected at the top by a brace rod 9, and winding drums 10 are rotatively mounted between the opposed members of beams 5, a cable 11 passing from each paddle to its respective winding drum, and a ratchet and pawl means 12 is provided for adjusting and retaining the paddles in position to be acted upon by the waves and surf, the vertical adjustment of the paddles most effectual in receiving power motion therefrom, being maintained thereby. Pitman rods 13 connect brace rods 9 with reciprocating members 14, which slide in guides 15, preferably of channel iron, and mounted on journal bearing supports 16.

The two shafts 17 are mounted to rotate in bearing supports 16 and in longitudinal alinement. A right hand spiral groove 18 is formed in one shaft 17 and a left hand spiral groove 18 is formed in the other shaft 17. The reciprocating members 14 have cams 19 projecting into the grooves 18 so that the shafts 17 are rotated back and forth as the members 14 reciprocate.

Through transmitting clutches 20 a continuous rotary motion is imparted to the intermediate shaft 21, each of the shafts 17 having a driving head 22 carrying friction dogs 23, spring pressed into engagement with an enveloping cone 24, on the intermediate shaft. The paddles are so mounted as to be successively acted upon by the advancing waves and surf. The intermediate shaft is therefore mounted between and in co-axial alinement with alternately rotative spiral grooved shafts 17 which are successively rotated through suitable means by the paddle movements.

The dogs 23 in the clutches 20 are set to work in opposite directions, so that when one clutch is working the other clutch is slipping, and vice versa, as required to drive the intermediate shaft 21 in one direction by the back and forth rotation of the shafts 17, so that power is imparted to the shaft 21 by the forward movement of one member 14 and by the backward movement of the other member 14.

The oscillating paddles 3 are constructed to efficiently receive the force of the waves; with this object in view, having flange faces curving outwardly, more or less, at the bottom as indicated at $a$ to serve as a scoop for the power impulses of the waves; the impinging face at $a$ thus offering greater resistance than the opposite convex non-resistant face $b$ offers. The paddles 3 face in opposite directions, one to receive the force of the incoming waves and the other to receive the force of the outgoing waves.

The next successive step in the conversion of wave power into mechanical power is accomplished by a counter shaft 25, pulleys 26, 27, mounted respectively on the intermediate and counter shafts, and a transmission belt 28 connecting the pulleys 26, 27. A driving friction wheel 29 on the counter shaft in contact with the driven friction wheel 30 on power shaft 31 provides further safety in power generation and affords a means of speed adjustment in connection with a centrifugal governor 32 and a momentum element or fly wheel 33. The governor is driven by means of miter gears 34 from shaft 31 and moves wheel 30 to and fro from periphery to center of driving wheel 29. Driven friction wheel 30 is provided with a tongue 35 engaging with longitudinal slot 36 in shaft 31, and hub 37 with a loose collar 38 in groove 38' of the hub, within which collar the hub rotates while having a linear movement with respect to the shaft and rotating in conjunction therewith.

A connecting rod 39 extends between collar 38 and collar 40 on the governor, having an angular disposition with reference to shaft 31 and driven wheel 30 whereby the vertical movement of governor collar 40 controls the position of said driven wheel with reference to the driving wheel 29 and is effective in regulating the speed. Driving wheel 29 is provided with a set screw 41 for adjustment to take up wear, with reference to driven wheel 30.

The parts subjected to the greatest strain and wear in the transmutation of power, that is to say; the cams or teeth 19 are readily accessible for renewal, each cam comprising a block 42 with oblong bearing faces 43 and a shank 44 which is held in corresponding recesses 45 in the reciprocating members 14 and detachable caps 46 thereon.

From the foregoing it may be seen that the translation of ocean energy into mechanical power is accomplished by simple elements, and that the transmission of the power is through elements having spiral engagement with one another, the arrangement being such that the intermittent movements of certain of the elements is resolved into a continuous motion maintained by a momentum retainer or fly wheel element 33, and made uniform by a governing element, all elements being thereby protected in their movements relatively one to another against strain and breakage.

I claim:—

1. The combination with oscillating paddles, of horizontally reciprocating crosshead members actuated by the paddles and having longitudinal bores, opposed cams projecting in the interior of the reciprocating members, spiral grooved horizontal shafts actuated by the reciprocating members, the said cams engaging with the said grooves, and the said spiral grooved shafts having an alternating rotary movement, a countershaft actuated by the said spiral grooved shafts, and clutch means for converting the alternating rotary movement of the spiral grooved shafts into a continuous rotary movement of the countershaft.

2. In an ocean power generator the combination with oscillating paddles actuated by the waves, of means for converting the motion of the paddles into mechanical power comprising horizontally reciprocating crosshead elements actuated by the paddles, spirally grooved shafts actuated by the reciprocating crosshead elements, a countershaft driven by the spirally grooved shafts, a power shaft actuated by the countershaft, and the power shaft having governing means actuated by constant and non-reversible friction means in order to secure a uniform speed of rotation.

3. The combination with oscillating paddles actuated by the waves, of a reciprocating element actuated by the swinging paddles, horizontal ways for the reciprocating elements, spiral grooved shafts rotatively mounted between said ways and actuated by the reciprocating elements, an intermediate shaft in alinement with said spiral grooved shafts, and ratchet means co-acting with said shafts.

4. The combination with oscillating paddles actuated by the waves and reciprocating members actuated by the paddles, of spiral grooved shafts rotated alternately in opposite directions by the reciprocating members, an intermediate shaft in alinement with the spiral grooved shafts, friction ratchets in connection with said shafts rotating the intermediate shaft continuously in a constant direction, and a momentum retainer in connection therewith.

5. The combination with oscillating paddles actuated by the waves and a rotating momentum retainer and speed governor therefor, of means for transmitting motion from the paddles to the momentum retainer, comprising reciprocating members actuated by the paddles, spiral grooved shafts actuated by the reciprocating members, an intermediate shaft alined with the spiral grooved shafts, friction ratchet means in connection with the spiral grooved shafts and the intermediate shaft, a counter shaft, a friction driving belt connecting the intermediate shaft and the counter shaft, and friction pulleys transmitting motion from the counter shaft to the momentum retainer.

6. In an ocean power, the combination of a frame work, vertical levers pivotally mounted in the frame work and spaced apart, paddles mounted on the lower ends of the levers, means for raising and lowering the paddles, reciprocating crossheads connected to the upper ends of the levers, spiral grooved shafts rotated back and forth by the reciprocation of the crossheads, a driving shaft and ratchet clutches connecting the spiral grooved shafts to the driving shaft.

7. In an ocean power, the combination of a frame work, a vertical lever pivotally mounted in the frame work, a paddle mounted on the lower end of the lever, a reciprocating crosshead connected to the upper end of the lever, a spiral grooved shaft, a cam extending from the crosshead into the groove to rotate the shaft back and forth as the crosshead reciprocates, a driving shaft and a ratchet clutch connecting the spiral grooved shaft to the driving shaft so as to rotate the driving shaft one way by the back and forth motion of the spiral grooved shaft.

8. In an ocean power, the combination of pivoted levers, paddles on the lower ends of the levers, reciprocating crossheads connected to the upper ends of the levers, spiral grooved shafts extending through the crossheads, cams extending from the crossheads into the spiral grooves of the shafts, said shafts being in longitudinal alinement, a driving shaft mounted between the spiral grooved shafts, ratchet clutches connecting the spiral grooved shafts to the driving shaft, a fly wheel, a variable speed transmission between the fly wheel and the driving shaft, and a governor for the variable speed transmission.

In testimony whereof, I have hereunto set my hand at Los Angeles, California, this 20th day of July, 1914.

NILS S. ABRAHAMSON.

In presence of—
ESTELLA HILL,
F. M. KEENEY,